Sept. 13, 1955
L. R. KOLLER
2,717,844
METHOD OF RENDERING TITANIUM DIOXIDE
FILMS ELECTRICALLY CONDUCTIVE
Filed March 19, 1954
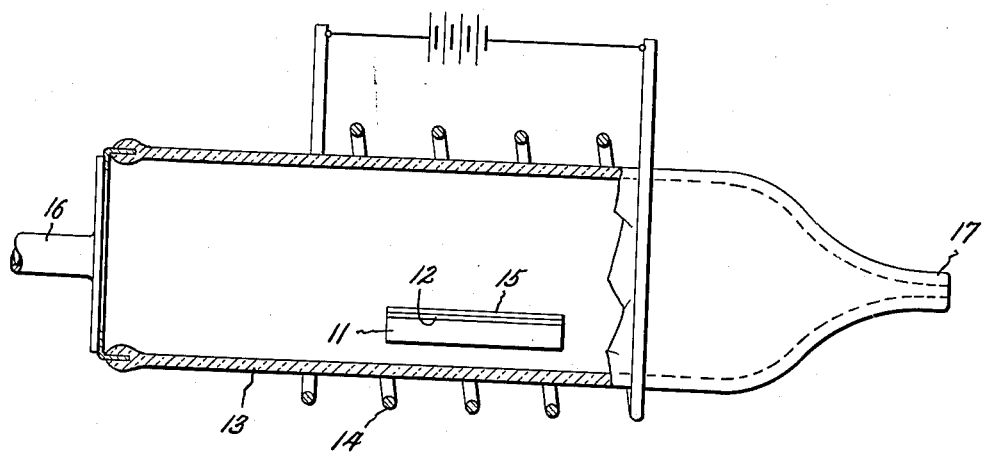
INVENTOR.
Lewis R. Koller
BY
Paul A. Frank
His Attorney

United States Patent Office 2,717,844
Patented Sept. 13, 1955

2,717,844

METHOD OF RENDERING TITANIUM DIOXIDE FILMS ELECTRICALLY CONDUCTIVE

Lewis R. Koller, Schenectady, N. Y., assignor to General Electric Company, a corporation of New York Application March 19, 1954, Serial No. 417,419

9 Claims. (Cl. 117—211)

The present invention relates to transparent films and to methods for making such films conducting.

In the manufacture of certain types of cathodoluminescent screens for cathode ray tubes the presence of a transparent conducting film between glass and screen is desirable and often necessary. Similarly, in electroluminescent cells of the type disclosed in my application Serial No. 257,752 filed November 23, 1951 and assigned to the same assignee as the present invention, the presence of a transparent conducting film is desirable.

To a large extent tin oxide films have been used in such applications. However, in some cases tin oxide is not satisfactory. For example if a zinc or cadmium sulfide phosphor film is deposited upon a transparent conducting film of tin oxide, the desirable characteristics of both films are destroyed. It is therefore desirable to prepare transparent conducting films which may be used when tin oxide films may not. One such film is titanium dioxide. One means for preparing a transparent conducting film of titanium dioxide is disclosed in application Serial No. 243,271 filed August 23, 1951 by D. A. Cusano and Frank J. Studer and assigned to the same assignee as the present application. This process utilizes the deposition of a zinc or cadmium sulfide phosphor film upon the non-conducting titanium dioxide film to render it conducting. In the event that a film of zinc or cadmium sulfide is not to be used in conjunction with a transparent titanium dioxide film, it is desirable that a method be available to render such titanium dioxide films conducting without the deposition of an additional film thereon.

It is an object therefore of my invention to render films of titanium dioxide conducting by a simpler and less expensive method than has been heretofore provided.

A further object of my invention is to render titanium dioxide films conducting by a process which leaves no added film which must be later removed.

Briefly stated, my invention comprises a method of rendering titanium dioxide films conducting by baking such films in close contact with powdered or granular metallic zinc in a controlled atmosphere at elevated temperatures.

My invention, however, may best be understood by reference to the following description taken in connection with the accompanying drawing which represents an oven in which my process may be conducted.

Referring now to the drawing, a glass plate 11 upon which there has been deposited a film 12, of titanium dioxide, is suspended in a glass or refractory oven 13 surrounded by a heating coil 14. A quantity of powdered zinc 15 is placed upon glass plate 11 in contact with film 12. Gas of a particular nature which supplies the desired atmosphere for the present reaction is supplied by tube 16 and passes from the reaction chamber by outlet 17. If the exhaust gases are inflammable they may be burned at outlet 17, or if not, they may be piped away.

A titanium dioxide coating 12 may first be formed upon plate 11 by passing a stream of titanium tetrachloride vapor over the glass surface. The glass is heated, preferably to a temperature of from 200° to 250° C. Lower temperatures may be used, but at lower temperatures (in the vicinity of 150° C.) the film becomes granular. Film thickness may be measured by several means. For films greater in thickness than approximately 0.7 micron, optical measurements are most frequently used. Films of thickness below 0.7 micron may be measured, and their thickness controlled in formation, by the observance of the apparent change in color of the film due to the occurrence of successive orders of interference colors.

The thickness of the titanium dioxide films is not critical in the process comprising my invention, but rather is governed by the ultimate purpose of the resultant product. Thus, films which are to be used as electrodes for electroluminescent cells are generally formed to a thickness evidenced by the formation of the second or third order of interference colors (approximately 0.2 to 0.4 micron).

As formed, this layer of titanium dioxide has a high resistance (of the order of several thousand megohms per square) and is not suitable as a conductor or as an electrode. Such a titanium dioxide coating, however, may be rendered conducting by covering it with a layer of zinc, either powdered or granular, and firing at atmospheric pressure in an atmosphere of hydrogen, nitrogen or hydrogen sulfide. Firing is to be conducted at elevated temperatures. With the reaction carried on at atmospheric pressure, optimum results appear to be obtained at a range of temperatures from 550° to 600° C. At temperatures below 550°, the decrease in resistance of the film is not as great as above 550° C. At temperatures above 600° C., the glass plates tend to become discolored. The best values of resistivity obtained from such treatment were obtained when firing was conducted for at least one hour and preferably from one to two hours. Firing longer than two hours does not appear to result in lower resistances. Firing for less than one hour does not appear to sufficiently decrease resistivity. The lowest values of resistivity were between 1200 and 2500 ohms per square but more often the values were from 5000 to 10,000 ohms per square.

As an example of my process a titanium dioxide film was formed on a glass plate having a thickness equivalent to the second order of interference colors. This film was packed with zinc dust and fired at 550° C. for one hour in a stream of $H_2S$. After firing the sample exhibited a resistance of 3500 ohms per square. Another sample of the same approximate thickness was fired at 550° C. in a stream of $H_2S$ for two hours. After firing, it exhibited a resistance of 1600 ohms per square. A third sample of the same approximate thickness, after firing for one hour in a stream of dry hydrogen at a temperature of 600° C., exhibited a resistance of 4000 ohms per square. A fourth sample of the same approximate thickness, after firing for two hours at a temperature of 550° C. in a stream of dry nitrogen exhibited a resistance of 1200 ohms per square. While the resistance of these samples vary somewhat, they are all of the same order of magnitude and are sufficient to render a film of titanium dioxide conducting for the uses of electrodes and equipotential plates. The improvement of conduction over untreated films is by a factor of the order of $10^6$ or better.

Thus, it may be seen that I have conceived a means for the production of conducting layers of titanium dioxide which is simple, easy to perform and which may

What I claim as new and desire to secure by Letters Patent of the United States is:

1. The method of rendering a film of titanium dioxide conducting which comprises covering a supported film of titanium dioxide with a layer of finely divided zinc and baking at a temperature of from 550° C. to 600° C. in an atmosphere of nonoxidizing gas.

2. The method of rendering a film of titanium dioxide conducting which comprises covering a supported film of titanium dioxide with a layer of finely divided zinc and baking at a temperature of from 550° C. to 600° C. in an atmosphere of a gas selected from the group consisting of hydrogen, nitrogen, and hydrogen sulfide.

3. The method of rendering a film of titanium dioxide conducting which comprises covering a supported film of titanium dioxide with a layer of finely divided zinc and baking at a temperature of from 550° C. to 600° C. in an atmosphere of hydrogen.

4. The method of rendering a film of titanium dioxide conducting which comprises covering a supported film of titanium dioxide with a layer of finely divided zinc and baking at a temperature of from 550° C. to 600° C. in an atmosphere of nitrogen.

5. The method of rendering a film of titanium dioxide conducting which comprises covering a supported film of titanium dioxide with a layer of finely divided zinc and baking at a temperature of from 550° C. to 600° C. in an atmosphere of hydrogen sulfide.

6. The method of rendering a film of titanium dioxide conducting which comprises covering a supported film of titanium dioxide with a layer of finely divided zinc and baking at a temperature of from 550° C. to 600° C. in an atmosphere of a gas selected from the group consisting of hydrogen, nitrogen, and hydrogen sulfide for at least one hour.

7. The method of rendering a film of titanium dioxide conducting which comprises covering a supported film of titanium dioxide with a layer of finely divided zinc and baking at a temperature of approximately 575° C. in an atmosphere of a gas selected from the group consisting of hydrogen, nitrogen, and hydrogen sulfide.

8. The method of rendering a film of titanium dioxide conducting which comprises covering a supported film of titanium dioxide with a layer of finely divided zinc and baking at a temperature of approximately 575° C. in an atmosphere of a gas selected from the group consisting of hydrogen, nitrogen, and hydrogen sulfide for at least one hour at 550°–600° C.

9. The method of rendering a film of the order of 0.2 micron in thickness of titanium dioxide conducting which comprises covering a supported film of titanium dioxide with a layer of finely divided zinc and baking at a temperature of from 550° C. to 600° C. in an atmosphere of a gas selected from the group consisting of hydrogen, nitrogen, and hydrogen sulfide.

References Cited in the file of this patent

UNITED STATES PATENTS

| Number | Name | Date |
|---|---|---|
| 701,298 | Cowper-Coles | June 3, 1902 |
| 2,260,479 | Detrick et al. | Oct. 17, 1944 |
| 2,617,742 | Olson | Nov. 11, 1952 |

OTHER REFERENCES

Printed Circuit, N. B. S. Circular 468, 1947, pp. 16, 17, 25 and 26.